United States Patent [19]
Liebermann

[11] 3,840,808
[45] Oct. 8, 1974

[54] CLAMP-ON ELECTRICAL METER
[75] Inventor: Leonard N. Liebermann, LaJolla, Calif.
[73] Assignee: TIF Instruments, Inc., Miami, Fla.
[22] Filed: Apr. 30, 1973
[21] Appl. No.: 355,466

[52] U.S. Cl. ............................ 324/127, 324/149
[51] Int. Cl. .................... G01r 1/22, G01r 1/06
[58] Field of Search ............... 324/127, 149, 72.5

[56] References Cited
UNITED STATES PATENTS
2,819,448  1/1958  Neeper .......................... 324/149
3,213,366  10/1965  Eadie, Jr. ....................... 324/127

Primary Examiner—Alfred E. Smith
Assistant Examiner—Ernest F. Karlsen
Attorney, Agent, or Firm—Pennie & Edmonds

[57] ABSTRACT

An improved electrical measuring device including a clamp-on ammeter is disclosed wherein a probe for obtaining readings of resistance and/or voltage is rigidly affixed to one of the clamp-on jaws of the ammeter and internally electrically connected through the jaw to circuits provided in the body of the device. This probe, attached to a clamp on jaw, in conjunction with an additional probe on a flexible cable render the device capable of providing convenient and accurate readings of resistance or voltage under a wide variety of operating conditions.

1 Claim, 3 Drawing Figures

PATENTED OCT 8 1974  3,840,808

CLAMP-ON ELECTRICAL METER

BACKGROUND OF THE INVENTION

1. Field of Invention

This invention relates to a multiple-function electrical measuring device, or meter, and more particularly to an improved electrical meter for measuring current, resistance and voltage.

2. Description of the Prior Art

Multiple function electrical meters including a clamp-on ammeter and movable probes for voltage and resistance readings are known and are generally employed to make electrical readings of current, voltage and resistance on various electrical devices. Such meters are normally compact, hand-held devices utilized by an individual and are designed for field use, often under difficult conditions. Conventionally, such meters wherein the ammeter is of the clamp-on type include movable probes, each on a respective flexible cable, used for obtaining readings of resistance and voltage. In using prior art devices, however, "three-hand" operation is often necessary in that one hand holds the instrument body in a convenient position to make any necessary range or other adjustments and to view the readout, a second hand operates one movable probe to contact the point at which voltage is to be read or resistance determined, and a third hand holds the other movable probe to contact the circuit ground or some other appropriate contact point. Often, therefore, an assistant is needed to make the measurement or the operator must make do with two hands instead of three, often leading to highly awkward situations and sometimes producing erroneous measurements.

At least one device has sought to solve this problem by providing a clip for attaching one of the movable probes to the meter body, for example to one of the ammeter jaws, the flexible cable attached to the clipped-on probe extending around the body and to the rear of the instrument. These devices, however, in attempting to avoid the necessity for a "third-hand" in making voltage and resistance measurements, have created additional operating problems. The attached probe is not susceptable of rigid mounting and is readily skewed or separated from the instrument body under cramped or difficult working conditions. Additionally, the loop of cable extending from the probe often gets in the operator's way, catching on protruding objects and sometimes disconnecting. It is at best a haphazard arrangement.

SUMMARY OF THE INVENTION

In accordance with the invention, an electrical meter capable of providing readings of current, voltage and resistance is provided in a unitary body wherein the ammeter is of the clamp-on type and is provided with two openable jaws mechanically and electrically affixed to the body. A probe member is provided which is rigidly attachable to one of the jaws and electrically connected within the jaw to the appropriate circuits within the instrument body. The probe member may be permanently or removeably attached to the jaw member.

With a single additional probe on a flexible cable extending from the instrument body, this structure facilitates accurate, reliable and safe measurement of voltage or resistance with one or at most two hands even under highly adverse conditions.

DESCRIPTION OF THE PREFERRED EMBODIMENT

Figure 1:
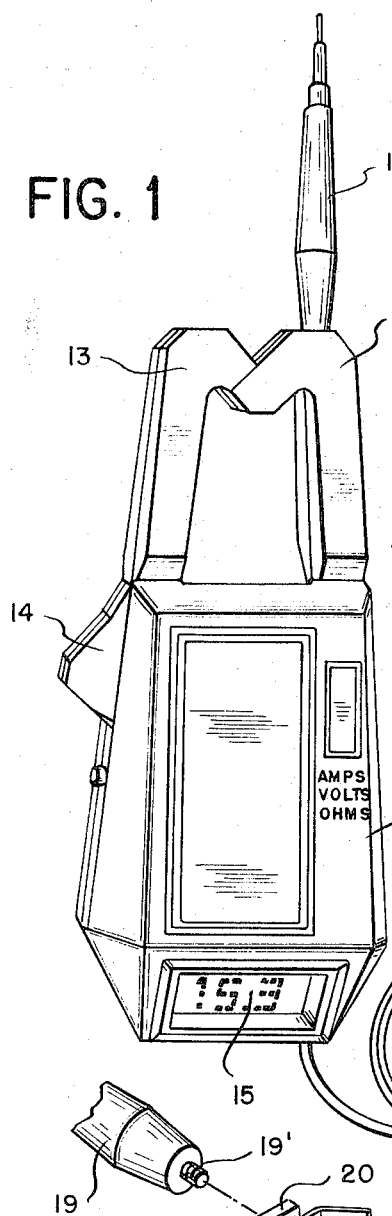
FIG. 1 is a front plan view of the device.

Referring to FIG. 1, an improved electrical meter 10 in accordance with the present invention comprises a main body 11 containing circuits (not shown) for measuring amperage, resistance and voltage.

Two jaw members 12, 13 are mechanically and electrically connected to the main body 11 and actuable in the conventional manner by actuator mechanism 14 to open so that they may be clamped around a conductor to permit measurement of the current flowing in it. The value of such current as well as the value of voltage or resistance measured with the appropriate probes appears on a conventional meter or digital display in readout window 15.

Figure 2:
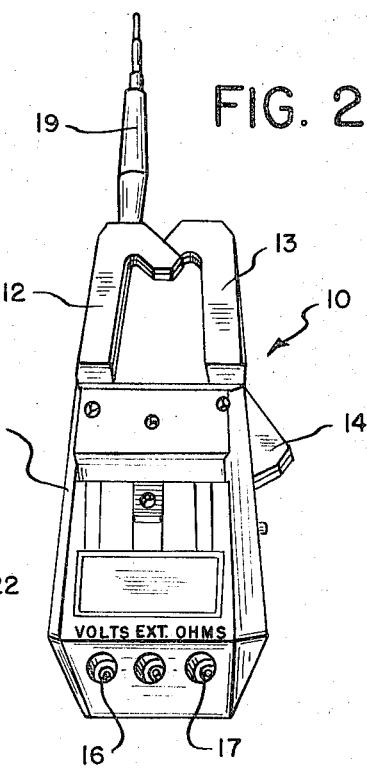
FIG. 2 is a back plan view of the device.

Referring to FIG. 2, the main body 11 is provided with jacks 16 and 17 which are connectable to movable probes, e.g. the movable probe 22 on flexible cable 22, as shown in FIG. 1.

Figure 3:
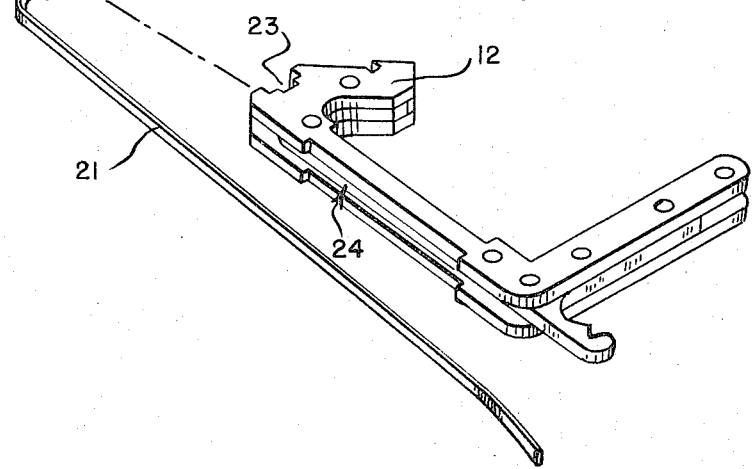
FIG. 3 is an exploded partial perspective view of the jaw member, connector, insulated wire and fixed probe.

Jaw member 12 has a probe member 19 attached to it for contacting a conductor to measure voltage or resistance, which probe member may be permanently mounted on jaw member 12. Referring to FIG. 3, however, probe member 19 is removably connected to jaw member 12. The bottom end of probe member 19 is provided with a threaded portion 19' which may be readily screwed into nut 20, the threaded portion of which makes electrical contact with probe 19 but the exterior of which is insulated, for example with rubber or a polymer coating, from the metal of the jaw 12. The insulated nut 20 is imbedded in or otherwise permanently attached to the jaw member and provides an electrical connection between probe 19 and the measuring circuits within the instrument body through insulated wire 21 when the threaded portion 19' is engaged with insulated nut 20. The insulated wire 21, which may conveniently be a copper strip coated with any conventional insulating material, is embedded in jaw member 12, the shape of which includes a cutout portion 23 and a channel 24 for receiving the nut 20 and conductor 21, respectively, without unduly affecting the symmetry and form of the jaw. Conductor 21 is preferably spot welded to nut 20 to assure good contact between them, although any means may be used to fasten the two which will assure continued contact during the life of the instrument.

By this means, there has been provided in accordance with the invention a multi-function meter including a clamp-on ammeter which, with probe 19 removed, is operable as a clamp-on ammeter and which with probe 19 attached is operable to measure voltage or resistance, holding the meter itself in one hand and auxillary probe 22 in the other hand. No hanging wires exist to interfere with operation in cramped quarters or under adverse circumstances, and rigid attachment of probe 19 to the body of the meter by a unitary mount providing both the electrical and mechanical connections prevents its being accidently disconnected in the course of making a measurement.

It will be appreciated by those skilled in the art that various changes and modifications may be made to the above described preferred embodiment without departing from the scope and spirit of the invention as defined by the claims herein.

I claim:

1. An improved multi-function electrical meter including a body containing a socket for attaching an electrical probe on a flexible cable and circuits for measuring current and at least one other electrical parameter; a clamp-on probe including two jaw members mechanically and electrically connected to the body of the meter for measuring current said jaw members being configured so that at least one of them forms a mounting surface substantially transverse to the instrument access at its furthest extremity from the instrument said jaw member containing in its interior a threaded socket adjacent said mounting surface; a conductor extending from the socket through the jaw member into the body for connection with the circuits therein; an insulating coating on the surfaces of the socket and conductor for preventing electrical contact between either of them and the jaw member; and a conductive probe member provided with a threaded portion engageable in the threaded socket for measuring various electrical parameters in conjunction with the probe on the flexible cable, without the necessity of using more than two hands in order to make such measurement.

* * * * *